(12) United States Patent
Andreoletti et al.

(10) Patent No.: US 8,949,031 B2
(45) Date of Patent: Feb. 3, 2015

(54) SEISMIC SURVEY METHOD OF THE SUBSOIL

(75) Inventors: Clara Andreoletti, Milan (IT); Nicola Bienati, Varese (IT)

(73) Assignee: ENI S.p.A., Rome (IT)

( * ) Notice: Subject to any disclaimer, the term of this patent is extended or adjusted under 35 U.S.C. 154(b) by 412 days.

(21) Appl. No.: 13/369,626

(22) Filed: Feb. 9, 2012

(65) Prior Publication Data

US 2012/0253682 A1     Oct. 4, 2012

(30) Foreign Application Priority Data

Feb. 10, 2011    (IT) .............................. MI2011A0197

(51) Int. Cl.
*G01V 1/00* (2006.01)
*G01V 1/28* (2006.01)

(52) U.S. Cl.
CPC ..................................... *G01V 1/282* (2013.01)
USPC .......................................................... 702/16

(58) Field of Classification Search
None
See application file for complete search history.

(56) References Cited

U.S. PATENT DOCUMENTS

| | | | |
|---|---|---|---|
| 5,671,136 A * | 9/1997 | Willhoit, Jr. ..................... | 702/18 |
| 6,002,642 A | 12/1999 | Krebs | |
| 8,406,081 B2 * | 3/2013 | Xia et al. ........................ | 367/73 |
| 2002/0183980 A1 | 12/2002 | Guillaume | |
| 2006/0133208 A1 | 6/2006 | Broto et al. | |
| 2006/0190179 A1 | 8/2006 | Herrmann et al. | |
| 2009/0326895 A1 | 12/2009 | Beasley | |
| 2012/0271550 A1 * | 10/2012 | Jiang et al. ..................... | 702/16 |

OTHER PUBLICATIONS

European Search Report issued on Sep. 12, 2011 in corresponding Italian Application No. MI 2011A 000197 (with an English Translation of Categories).

* cited by examiner

*Primary Examiner* — Aditya Bhat
(74) *Attorney, Agent, or Firm* — Oblon, Spivak, McClelland, Maier & Neustadt, L.L.P.

(57) ABSTRACT

A method for obtaining a volumetric image of a geological structure in the subsoil includes generating a plurality of seismic waves by plural seismic sources, acquiring signals or traces obtained by processing the seismic waves reflected by the geological structure for creating a seismic record or shot gather for the activation position of each seismic source, migrating, through a numerical processing, each shot gather to create a respective partial volumetric image of the geological structure, summing the single partial volumetric images to obtain the overall volumetric image of the geological structure, the summing of the single partial volumetric images being obtained by grouping the seismic sources into groups, grouping the groups of seismic sources into super-groups, and effecting N migrations for each super-group.

8 Claims, 6 Drawing Sheets

Creation of the super-groups

SEISMIC SURVEY METHOD OF THE SUBSOIL

BACKGROUND

1. Field of the Invention

The present invention relates to a seismic survey method of the subsoil and, more specifically, a survey method of the subsoil which uses data obtained from seismic responses generated from various seismic sources.

2. Description of Related Art

In order to identify geological structures in the subsoil, in particular potential hydrocarbon traps, effecting so-called seismic acquisition campaigns is known, in which seismic waves are used for effecting measurements of the non-invasive type. In a seismic acquisition campaign, seismic waves are generated by means of artificial sources which can be obtained with explosives, vibrating mechanical devices, air cannons or with any other device suitable for generating seismic waves.

Seismic wave sources are positioned in multiple positions on the surface of the land or sea, above the area to be surveyed. These sources are activated to generate seismic waves which propagate in depth, moving away from the same sources, towards geological structures in the subsoil. During the propagation, the waves are also partially reflected towards the surface on the part of the structures to be surveyed. Once they have reached the surface, the reflected seismic waves are detected and transformed into electric signals by specific sensors (geophones or hydrophones) and then recorded. The sensors are situated on the surface in suitable configurations. The position of the sensors can also vary with a variation in the position of the seismic wave source.

For offshore seismic acquisition campaigns, so-called "seismic ship" is used. The ship tows the seismic source, immersed in water, and a series of cables, also immersed, along which the sensors are arranged. Possible variants to this scheme are obtained by using various ships contemporaneously, which entrain additional cables and/or sources. Different recordings are obtained by activating the seismic wave source in different positions along the navigation line and recording the data for all the sensors and for a finite time after each activation. The navigation line is suitably projected so as to guarantee coverage of the whole area to be surveyed. The combination of all the data recorded for the same position of the source forms the so-called seismic record or "shot gather".

The signals registered during the seismic acquisition campaign are subsequently processed to obtain information relating to the structure and characteristics of the subsoil. The expression "seismic migration" refers in particular to the processing procedure which allows to obtain depth images of the separation surfaces between different rock layers starting from the seismic data. The migration is applied to the single shot gathers, producing a volumetric image of the subsoil for each shot gather. The shot gathers are therefore processed individually and the final image is obtained by summing the partial images produced by the migration of each single shot gather.

One of the disadvantages of this type of seismic survey is due to the fact that, in order to obtain an accurate survey of the subsoil through the migration of each single shot gather, numerous partial images must be summed. In this way, the cost of the seismic survey increases in proportion to the number of shot gathers to be migrated.

Furthermore, it should be pointed out that the calculation complexity due to the migration of each single shot gather is not negligible so that, in order to have reasonable operating times, considering the migration of a so-called "seismic dataset" of industrial dimensions (i.e. containing tens or hundreds of thousands of shot gathers), numerous supercomputers executing operations in parallel, must be used.

In order to make the seismic survey procedure more efficient, various shot gathers can be summed before their migration. In this way, however, the accuracy of the final image of the subsoil is jeopardized as the migration operation of the sum of the shot gathers is different from the summing operation of the migrations of each shot gather and, in addition, it introduces cross-talks into the final image itself.

BRIEF SUMMARY

An objective of the present invention is therefore to provide a survey method of the subsoil and, more specifically, a survey method of the subsoil which uses the data obtained from the seismic responses generated by various seismic sources, which is capable of over-coming the drawbacks of the known art mentioned above, in an extremely simple, economical and particularly function manner.

More specifically, an objective of the present invention is to provide a seismic survey method of the subsoil which is particularly rapid and economical with respect to current seismic survey methods.

Another objective of the present invention is to provide a seismic survey method which, although effecting the sum of various shot gathers before their migration, is capable of providing a particularly accurate volumetric image of the subsoil, reducing the intensity of the cross-talks which are generated with the current methods.

These objectives according to the present invention are achieved by providing a seismic survey method of the subsoil as specified in claim 1.

Further characteristics of the invention are indicated in the dependent claims, which are an integrant part of the present description.

BRIEF DESCRIPTION OF THE DRAWINGS

The characteristics and advantages of a seismic survey method of the subsoil according to the present invention will appear more evident from the following illustrative and non-limiting description, referring to the enclosed schematic drawings, in which.

DETAILED DESCRIPTION

Figure 1:
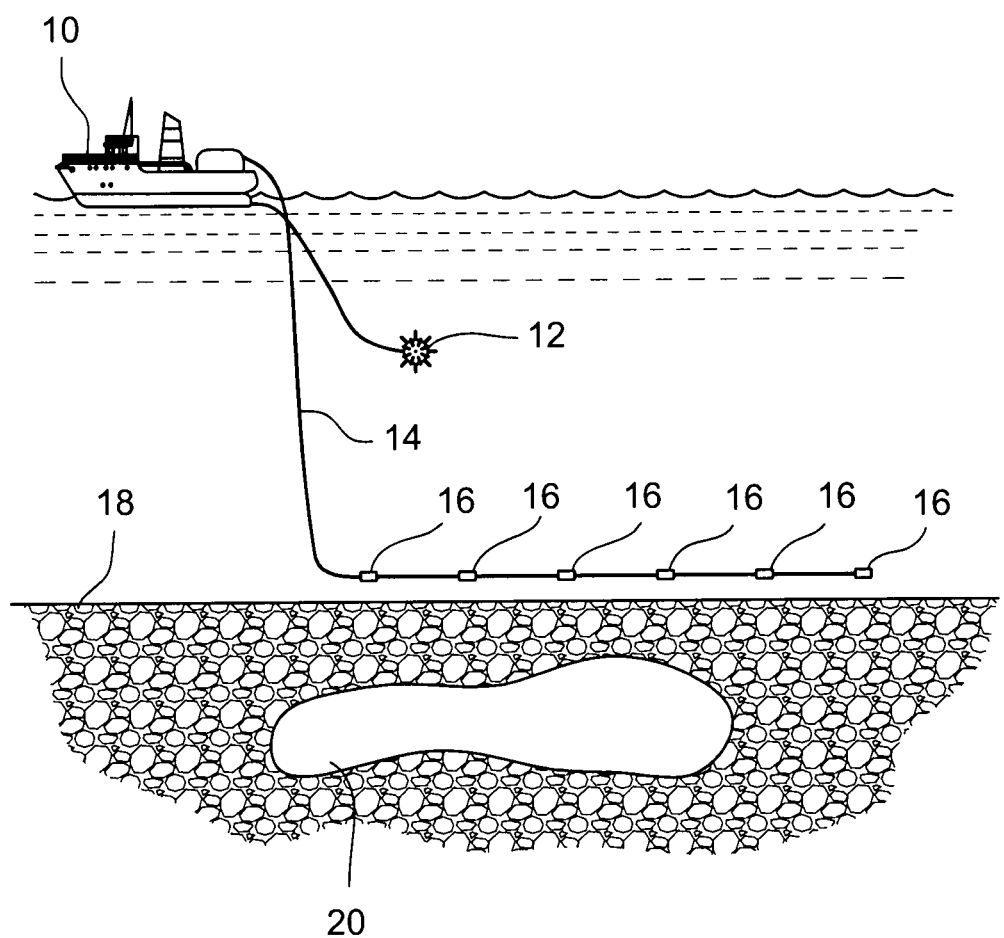
FIG. 1 is a schematic view of a so-called "seismic ship" and the relative equipment which implements the seismic survey method of the subsoil according to the present invention.

With reference in particular to FIG. 1, this shows a seismic ship and the relative equipment that allow to implement the seismic survey method of the subsoil, in particular beneath a sea bottom, according to the present invention. During a marine seismic acquisition, the seismic ship 10 tows behind it, immersed in water, a seismic source 12, consisting for example of an air cannon or other sound wave generators, and one or more cables 14. Seismic sensors 16, in particular hydrophones, are arranged along each cable 14. The length of the cables 14 and the distance between the hydrophones 16 are parameters established on the basis of the objectives of the seismic survey.

The cables 14 extend along the navigation line of the ship 10 and are possibly directed through the use of suitable directing devices (not shown). During the same seismic acquisition campaign, more than one ship can also be used, which move in coordination, towing further seismic sources 12 and/or cables 14 equipped with relative sensors 16. In other cases, the cables 14 are not towed but are laid along the sea bottom 18 before the seismic acquisition campaign is started.

The seismic source 12, towed by the ship 10, by means of a pneumatic device generates a seismic wave which propagates in the water and from there, through the sea bottom 18, into the subsoil. The geological structures 20 present in the subsoil partially reflect the seismic wave. Reflected waves are thus generated which propagate backward towards the surface. The hydrophones 16 receive the reflections coming from the subsoil and translate them into electric signals which are transmitted to the ship 10. These electric signals are then digitalized and recorded.

As it moves along its navigation line, the ship 10 activates the seismic source 12 at regular time intervals. The seismic source 12 is of the impulsive type and the reflections of the seismic waves are recorded for a finite time after each activation of the seismic source 12 itself. The signal recorded by a single hydrophone 16 for a certain position of the seismic source 12 is called trace. The collection of all the traces recorded for the same activation position of the seismic source 12 forms a shot gather. The combination of all the shot gathers recorded above the area object of the survey forms the seismic dataset.

Each single shot gather recorded is subsequently converted into a partial volumetric image of the geological structure 20 of interest. The overall image of the geological structure 20 of interest is obtained by summing the single partial images. The numerical processing which converts a shot gather into an image is called seismic migration.

Due to the location of a seismic source 12 and the relative shot gather, the seismic migration focuses each reflection recorded in the shot gather in the corresponding point of the subsoil in which the same reflection originated. In this way, an image of all the reflection points is obtained, i.e. an image of the geological structures 20 encountered by the seismic wave front during its propagation in the subsoil.

The focusing of the reflections is obtained in three subsequent phases:
1. numerically modelling the propagation of the wave generated by the seismic source 12. In this way, in relation to the position $xs_i$ of the seismic source 12, a first wave field $S_i(x,t)=S_i(t)$ is obtained in each point $x=(x,y,z)$ of the image and for all times t, $0 \leq t \leq T$;
2. back-propagation in depth the reflections registered by the hydrophones 16. The result is a second wave field $R_i(x,t)=R_i(t)$ in each point $x=(x,y,z)$ of the image and for all times t, $0 \leq t \leq T$;
3. combining the first wave field $S_i$ and the second wave field $R_i$, through a suitable imaging condition, to generate the overall image $I_i$. For example, using the cross-correlation between the two wave fields $S_i$ and $R_i$ as imaging condition, the image $I_i(x)=\Sigma_{t=0}^{T} S_i(t) R_i(t)$ is obtained.

According to current seismic survey methods, the refocalization process described above is repeated for each single shot gather and consequently the cost of the whole operation is proportional to the total number of shot gathers.

A way of reducing the costs therefore consists in applying seismic migration to the sum of various shot gathers, also defined as "composite N order shot gathers", "order" being the number of shot gathers summed. The sum of two or more shot gathers is a new shot gather whose seismic sensors 16 correspond to the union of the seismic sensors 16 of the single sources 12 and, in the case of seismic sensors 16 in coinciding positions, the relative traces are summed.

In the case of composite shot gathers, the refocalization again follows the process scheme in three consecutive phases described above, with the variant that in the first phase, all the seismic sources 12 are contemporaneously modelled. As the propagation of seismic waves satisfies the superposition principle of effects or, in other words, the effect obtained by contemporaneously activating two seismic sources 12 is equal to the sum of the single effects (the same is valid for the back-propagation described for the second phase), in the third phase, the imaging condition produces the following result:

$$I_i(x) = \Sigma_{t=0}^{T} (\Sigma_{i=1}^{N} S_i(t))(\Sigma_{i=1}^{N} R_i(t)) = \Sigma_{t=0}^{T} (\Sigma_{i=1}^{N} S_i(t) R_i(t) + \Sigma_{i \neq j} S_i(t) R_j(t))$$

where it is evident the error term:

$$\Sigma_{i \neq j} S_i(t) R_j(t)$$

The seismic survey method of the subsoil according to the present invention proposes to reduce the error term in obtaining the image $I_i$. First of all, suitable weights q are applied to the shot gathers, before summing them or, in other words, each trace of each shot gather is multiplied by a coefficient or "weight factor" q. All the traces of the same shot gather are multiplied by the same weight q. In the same way, in modelling the wave generated by the seismic source 12, said seismic source 12 is multiplied by the same weight factor q for which the relative traces were multiplied. In addition to the weights q, the seismic sources 12 to be combined must also be suitably selected, taking into account their reciprocal positions and the fact that two seismic sources 12 close to each other, if seen from a sufficiently great distance, are indistinguishable.

Let us consider the case with two seismic sources 12$_1$ and 12$_2$, for example, and assuming that their sum is first migrated. In this case a first image $I_1$:

$$I_1(x) = \Sigma_{t=0}^{T}(S_1(t)+S_2(t))(R_1(t)+R_2(t)) = \Sigma_{t=0}^{T}(S_1(t)R_1(t)+S_2(t)R_2(t))+(S_1(t)R_2(t)+S_2(t)R_1(t))$$

is obtained.

Let us now assume that the difference in the same two seismic sources 12$_1$ and 12$_2$, are migrated, obtaining a second image $I_2$:

$$I_2(x) = \Sigma_{t=0}^{T}(S_1(t)-S_2(t))(R_1(t)-R_2(t)) = \Sigma_{t=0}^{T}(S_1(t)R_1(t)+S_2(t)R_2(t))-(S_1(t)R_2(t)+S_2(t)R_1(t))$$

At this point, by summing the two images $I_1$ and $I_2$ and dividing the result by two, the same image that would be obtained by migrating the two seismic sources 12$_1$ and 12$_2$ separately, is obtained. At the same time, however, the cost for migrating these two seismic sources 12$_1$ and 12$_2$ has remained unvaried: in other words, two migrations must be computed in any case.

A gain can be achieved if two other seismic sources 12$_3$ and 12$_4$ different from those indicated with 12$_1$ and 12$_2$ are migrated in the second migration:

$$I_2'(x) = \Sigma_{t=0}^{T}(S_3(t)-S_4(t))(R_3(t)-R_4(t)) = \Sigma_{t=0}^{T}(S_3(t)R_3(t)+S_4(t)R_4(t))-(S_3(t)R_4(t)+S_4(t)R_3(t))$$

If the seismic sources 12$_1$ and 12$_3$ are very close to each other and, at the same time, if the seismic sources 12$_2$ and 12$_4$, are also very close, therefore, on the basis of the analogy whereby two nearby light sources are indistinguishable if seen from a distance much greater than their reciprocal distance, it is reasonable to assume that:

$$S_1(t) \approx S_3(t)$$

$$R_1(t) \approx R_3(t)$$

$$S_2(t) \approx S_4(t)$$

$$R_2(t) \approx R_4(t)$$

and therefore:

$$(S_1(t)R_2(t)+S_2(t)R_1(t)) \approx (S_3(t)R_4(t)+S_4(t)R_3(t))$$

A reasonable cancellation of the error term can therefore be expected, while the four seismic sources $12_1$, $12_2$, $12_3$ and $12_4$ have been migrated with only two migrations.

In the previous example, shot gathers composed of order 2 and two pairs of weights $q_{1,1}=+1$, $q_{1,2}=+1$ and $q_{2,1}=+1$, $q_{2,2}=-1$ were used. The example can be generalized in the case when a number N of composite N order shot gathers are to be grouped, therefore effecting the migration of $N^2$ seismic sources 12 with N distinct migrations. In this case, the weights $q_{j,i}$ must be obtained from the elements of an N order orthogonal matrix $Q_N=[q_{i,j}]$, that is, such as to be:

$$Q_N^T Q_N = I$$

Figure 2:
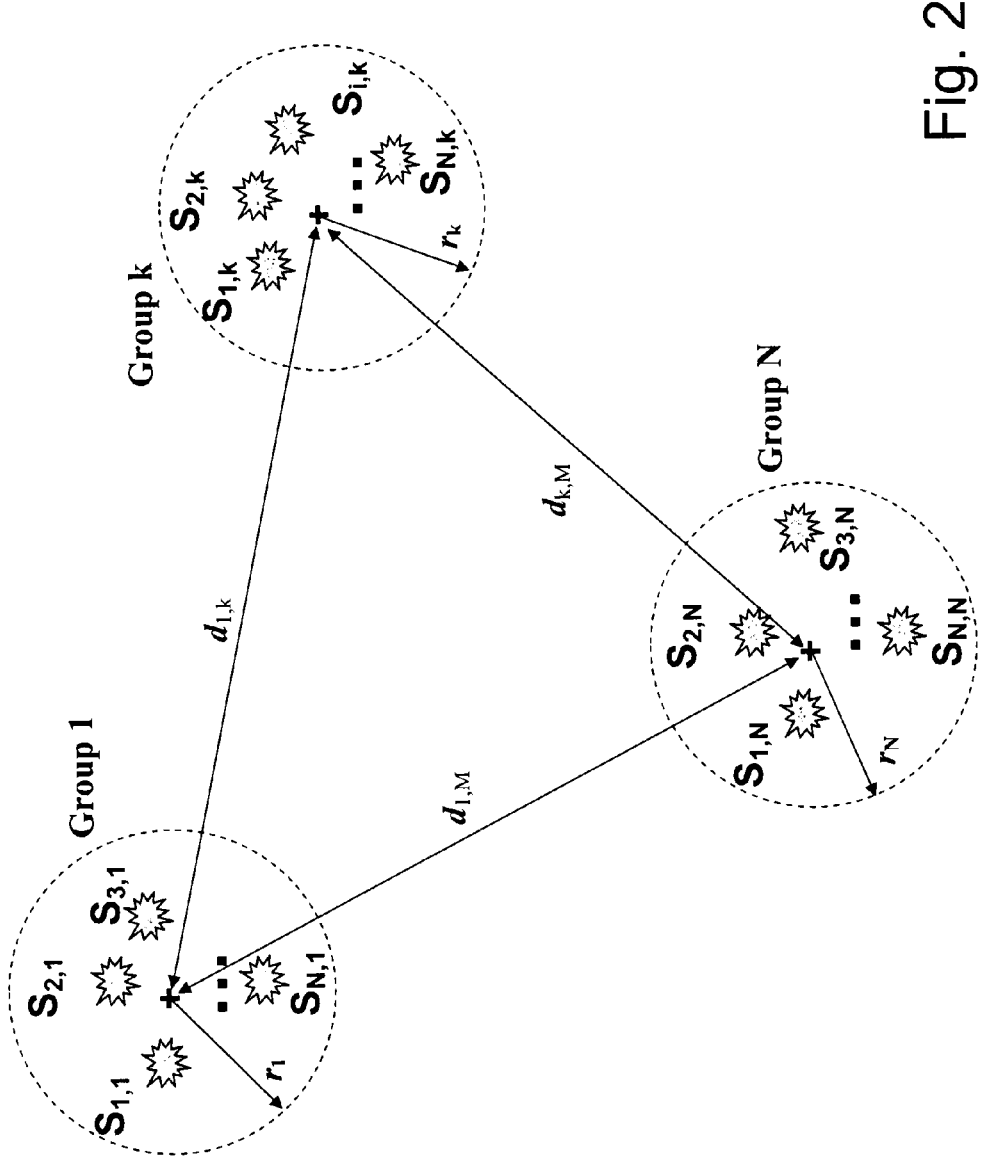
FIG. 2 is a schematic view which illustrates the geometrical relations between groups of seismic sources on the basis of the seismic survey method of the subsoil according to the present invention.
Figure 3:
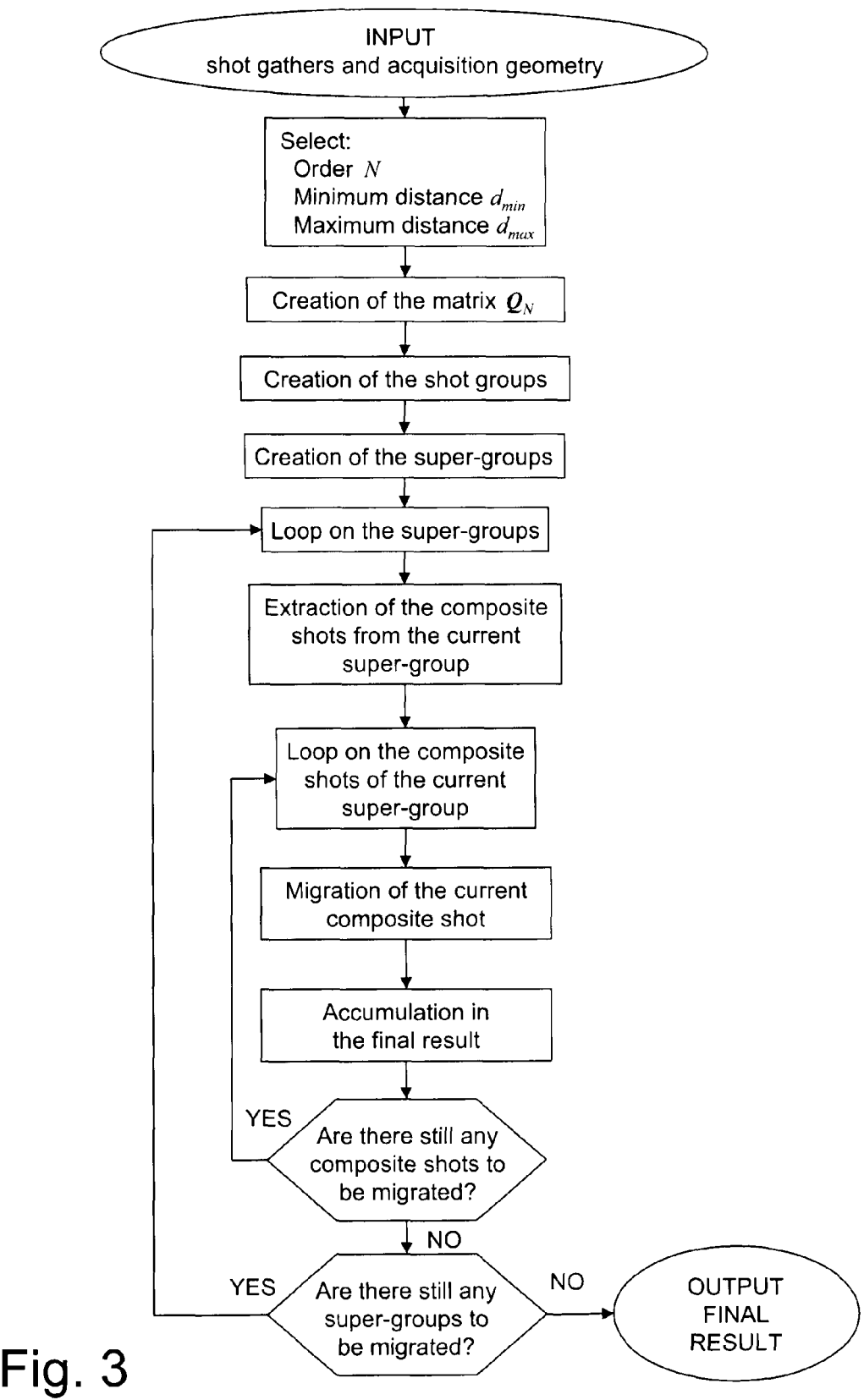
FIG. 3 is a block scheme which illustrates the main phases of the seismic survey method of the subsoil according to the present invention.
Figure 4:
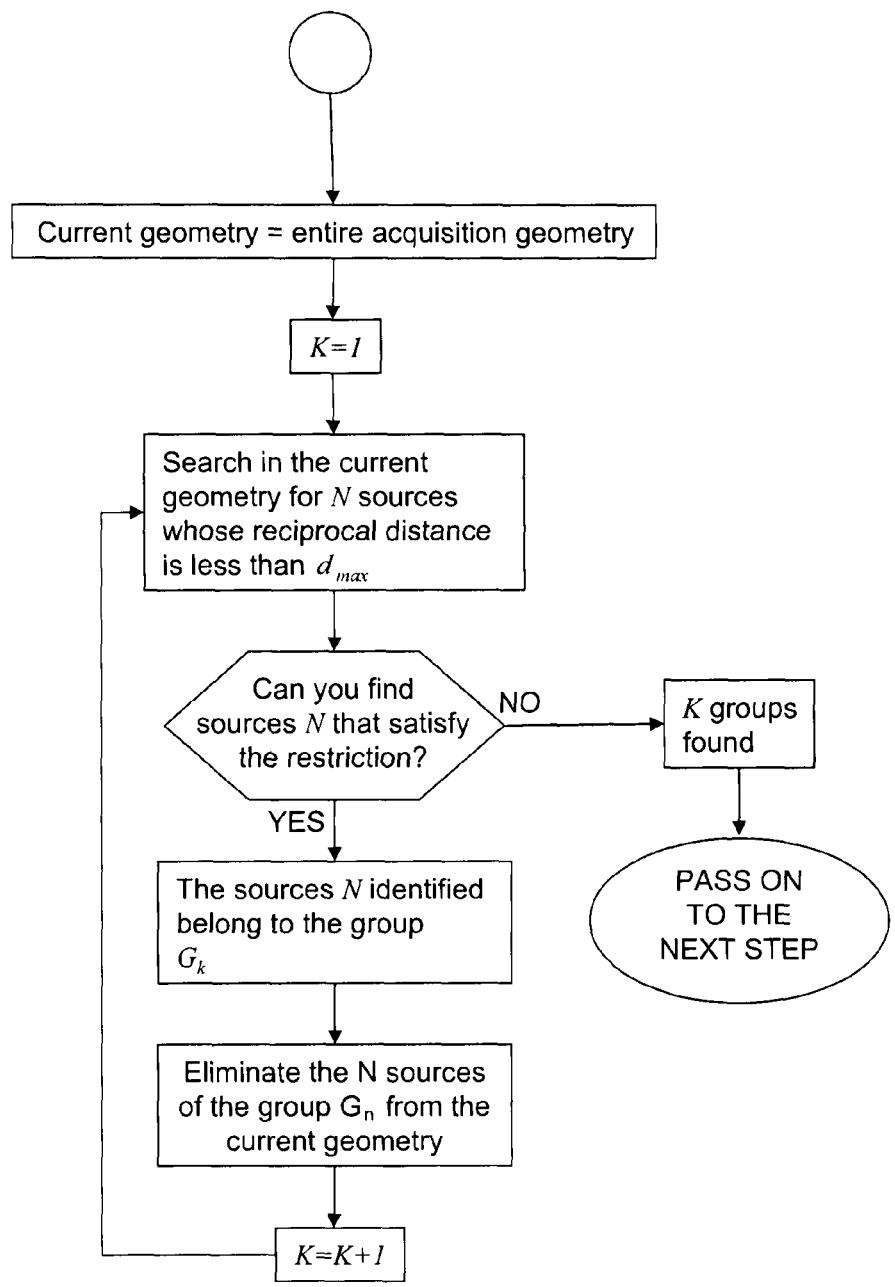
FIGS. 4 to 6 are block schemes which illustrate in more detail some sub-phases of the seismic survey method of the subsoil according to the present invention.
Figure 5:
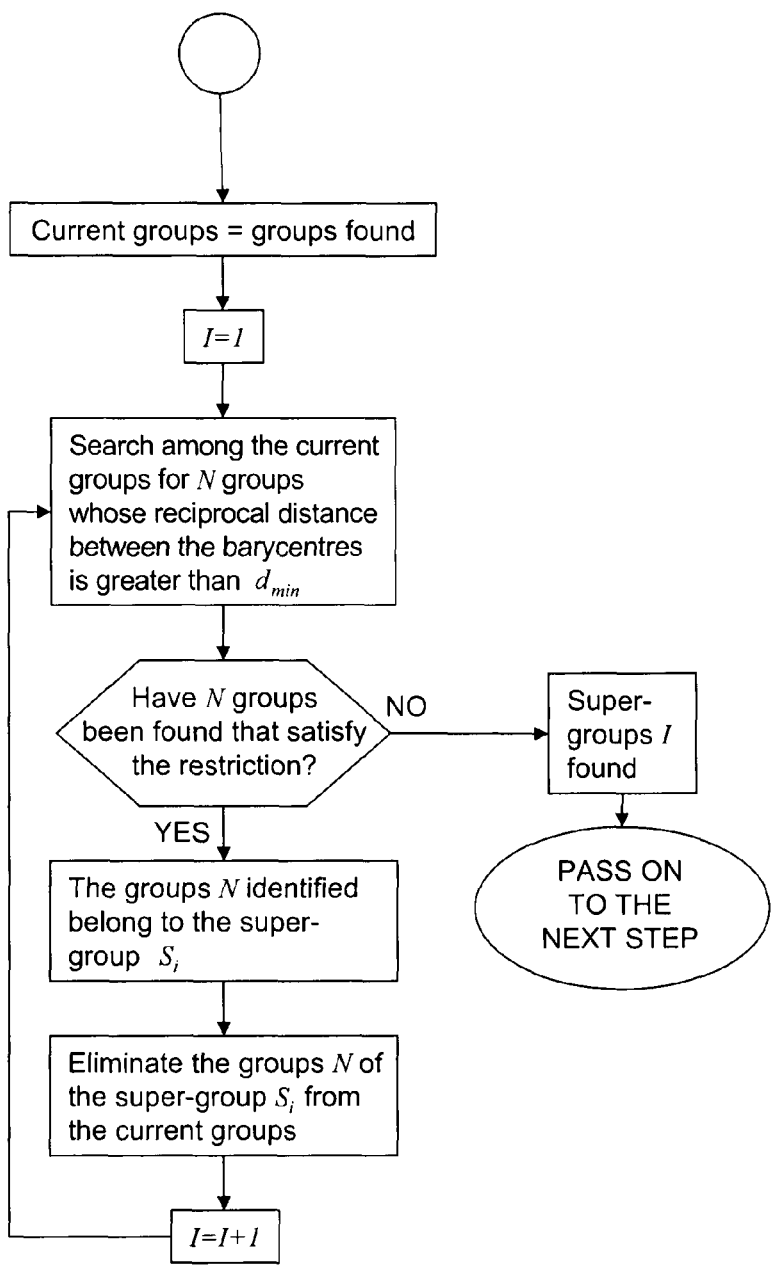

Furthermore, the seismic sources 12 to be combined must be selected with a suitable analysis of the positions of all the seismic sources recorded, as exemplified in FIG. 2. Once a minimum distance $d_{min}$ and a maximum distance $d_{max}$ have been selected:

the seismic sources 12 are grouped into a plurality of groups $G_N$ each of N seismic sources 12, wherein the N seismic sources 12 of a generic group $G_k$ (1≤k≤N) must have a reciprocal distance so as to be contained within a circumference having a predefined diameter $d_k$ equal to $2r_k \le d_{max}$ (FIG. 4);

the groups $G_N$ of seismic sources 12 are in turn grouped into super-groups each of N groups $G_N$ (FIG. 5). The groups $G_N$ of seismic sources 12 belonging to the same super-group must be selected so that the reciprocal distance $d_{i,k}$ between the barycentres of two distinct groups $G_i$ and $G_k$ is greater than the minimum distance $d_{min}$. In calculating the barycentres, each seismic source 12 is considered as a unitary mass point.

Figure 6:
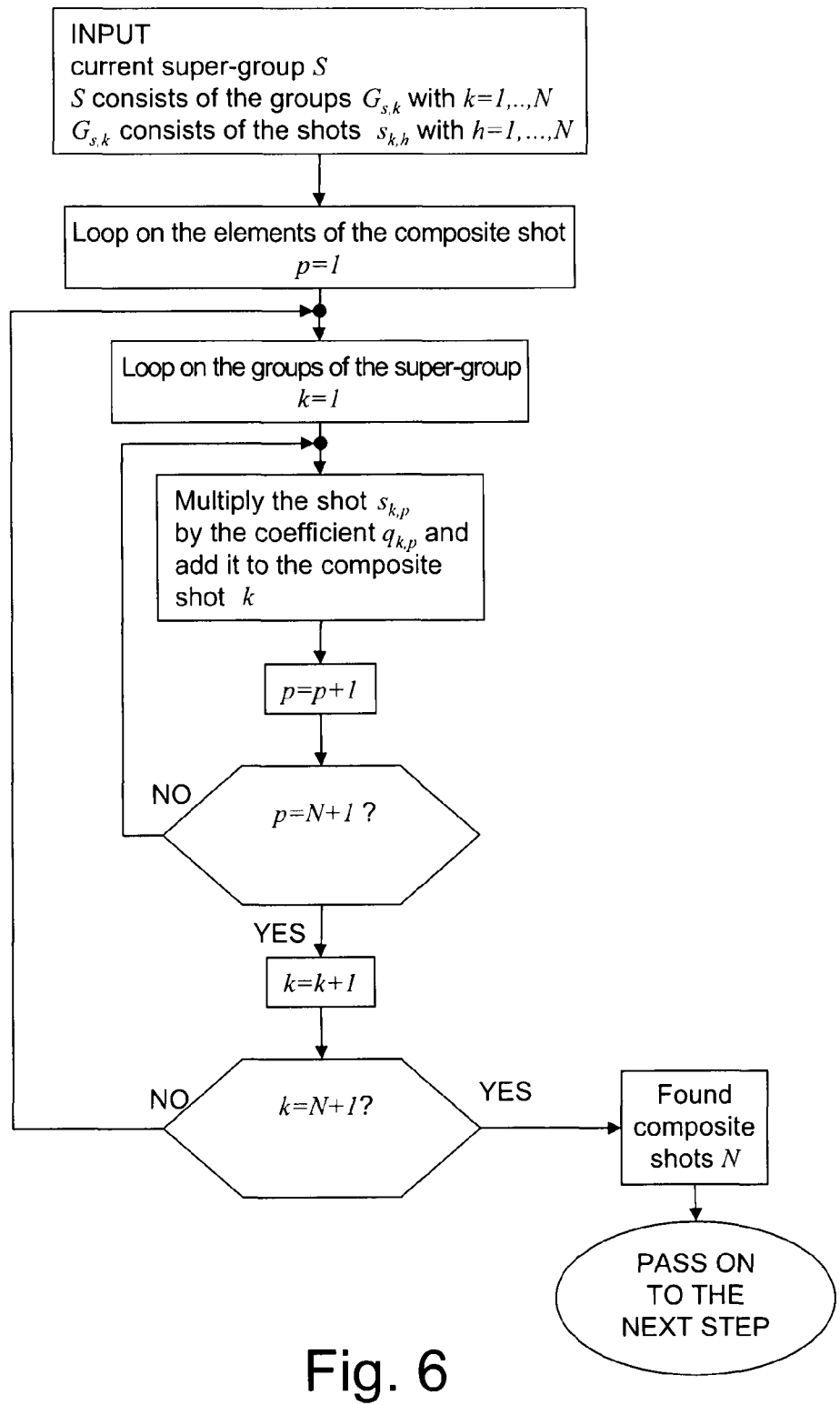

Each super-group is therefore composed of $N^2$ seismic sources 12 and, for each super-group, N migrations are effected, wherein for each migration a composite N order shot gather obtained by selecting a seismic source 12 from each group $G_N$, is migrated. The selection must be made so that each seismic source 12 of each group $G_N$ belongs to one and only one composite shot gather. In the migration of the $k^{th}$ composite shot gather, the relative shot gathers are summed with a weighed sum, wherein the coefficients $q_j$ applied to each shot gather are obtained from line k of the matrix $Q_N$ (FIG. 6).

The final volumetric image $I_i$ of the geological structure 20 is obtained from the sum of the partial images obtained from the migration of all the composite shot gathers for all the super-groups.

In general, in the acquisition, a multiple number of shot gathers $N^2$ is not necessarily acquired and/or, in any case, all the shot gathers may not necessarily be grouped so as to satisfy the restrictions on $d_{min}$ and $d_{max}$. In this case, when all the possible super-groups having a dimension N have been constructed and a consistent number non-grouped shot gathers remains, super-groups having a dimension N'=(N−p), can be constructed, with 1≤p≤(N−1), starting from p=1. With an increase in the value of p, the efficiency of the method according to the invention decreases, but in any case, a gain is obtained with respect to the case in which the shot gathers are migrated individually.

It can thus be seen that the seismic survey method of the subsoil according to the present invention achieves the objectives specified above. A net gain is in fact obtained, equal to N in the number of seismic migrations as, for each group of seismic sources considered, $N^2$ seismic sources are migrated with N migrations.

The seismic survey method of the subsoil of the present invention thus conceived can in any case undergo numerous modifications and variants, all included in the same inventive concept. The protection scope of the invention is therefore defined by the enclosed claims.

The invention claimed is:

1. A method for obtaining a volumetric image of a geological structure present in subsoil, the method comprising:

activating a plurality of seismic sources to generate a plurality of seismic waves;

acquiring a plurality of traces by registering with a plurality of seismic sensors and processing in one or more computers seismic waves reflected by the geological structure;

creating in the one or more computers a shot gather from the plurality of traces for each activation position of each seismic source;

grouping in the one or more computers the seismic sources into a plurality of groups of N seismic sources each, N being a finite, positive integer, the N seismic sources of each group in the plurality of groups having a reciprocal distance such as to be contained in a circumference having a diameter lower than a predefined maximum distance;

grouping in the one or more computers the groups of seismic sources into super-groups of N groups each, such that each super-group includes $N^2$ seismic sources and a reciprocal distance between barycentres of any two distinct groups of seismic sources belonging to a single super-group is greater than a predefined minimum distance;

effecting in the one or more computers N migrations for each super-group to obtain a partial volumetric image for each of the N groups in the super-group, wherein for each migration, a composite N-order shot gather is migrated through a numerical processing based on a seismic source selected from the group, thus obtaining an overall migration of $N^2$ seismic sources using N distinct migrations, wherein the migration of each N-order shot gather focuses each reflection registered in each shot gather, in a corresponding point of the subsoil in which the reflection originated, by numerically modelling in the one or more computers a contemporaneous propagation of seismic waves generated by activating the seismic sources of the group to obtain a first wave field in each point of the volumetric image in relation to the positions of the seismic sources and with respect to time, back-propagating in depth the registered reflections in the one or more computers to obtain a second wave field in each point of the volumetric image in relation to the positions of the seismic sources and with respect to time, combining the first wave field and the second wave field in the one or more computers to obtain the partial volumetric image; and combining the partial volumetric images obtained from the migrations of the composite N-order shot gathers in the one or more computers to attain an overall volumetric image of the geological structure.

2. The method according to claim 1, further comprising:
multiplying in the one or more computers each trace of each shot gather by a weight factor.

3. The method according to claim 2, wherein all the traces of a shot gather are multiplied in the one or more computers by a single weight factor.

4. The method according to claim 2 or 3, wherein the weight factor for each trace is obtained from elements of a matrix $Q_N$ of an orthogonal N order, that is, such as to be:

$$Q_N^T Q_N = I.$$

5. The method according to claim 4, wherein, in the migration of a $k^{th}$ composite shot gather of an N order, the relative shot gathers are added with a weighed sum, wherein the weight factors applied to each shot gather are obtained from a line k of the matrix $Q_N$.

6. The method according to claim 1, wherein, in the calculation of the barycentres of the groups of seismic sources, each seismic source is considered as a unitary mass point.

7. The method according to claim 1, wherein the selection of each seismic source from each group is effected in such a way that each seismic source of each group belongs to one and only one composite shot gather.

8. The method according to claim 1, wherein when a consistent number of non-grouped shot-gathers remains following the construction of all the possible super-groups having an N dimension, the construction of super-groups having a dimension $N'=(N-p)$, with $1 \leq p \leq (N-1)$, starting from $p=1$, is effected.

* * * * *